United States Patent [19]
Schröter et al.

[11] Patent Number: 5,384,015
[45] Date of Patent: Jan. 24, 1995

[54] ARRANGEMENT FOR FILLING COAL IN OVEN CHAMBERS OF A COKE OVEN BATTERY

[75] Inventors: Horst Schröter, Viersen; Horst Andreas, Düsseldorf, both of Germany

[73] Assignee: Hartung, Kuhn & Co. Maschinenfabrik GmbH, Essen, Germany

[21] Appl. No.: 105,713

[22] Filed: Aug. 12, 1993

[30] Foreign Application Priority Data

Aug. 25, 1992 [DE] Germany ............................ 4228191

[51] Int. Cl.6 ........................ C10B 31/04; C10B 31/02
[52] U.S. Cl. .................................. 202/251; 202/262; 202/269; 414/199
[58] Field of Search ............... 202/262, 263, 269, 251; 414/199

[56] References Cited

U.S. PATENT DOCUMENTS

| | | | |
|---|---|---|---|
| 3,857,758 | 12/1974 | Mole | 202/263 |
| 4,176,994 | 12/1979 | Sangster | 202/269 |
| 4,988,411 | 1/1991 | Schröter | 202/251 |

FOREIGN PATENT DOCUMENTS

| | | | |
|---|---|---|---|
| 2559390 | 9/1976 | Germany | 202/263 |
| 1723096 | 3/1992 | U.S.S.R. | 202/263 |

Primary Examiner—Joye L. Woodard
Attorney, Agent, or Firm—Michael J. Striker

[57] ABSTRACT

An arrangement for filling coal in oven chambers of a coke oven battery has a telescopable filling tube mountable on a filling car and having a lower end which is lowerable to a filling hole frame of a filling hole of a coke oven battery, an upper sealing ring arranged on an outer side of the upper end of a lower tubular piece and a lower sealing ring arranged on an outer side of the lower end of the lower tubular piece of the filling tube, and each having the shape of a portion of a sphere and being provided with upwardly and downwardly directed circular segment-shaped outer surfaces, an additional sealing ring arranged on an inner side of the lower end of an upper tubular piece of the filling tube and having an outer surface which is inclined upwardly, a contact ring loosely located on the lower sealing ring and corresponding to the latter, a filling hole frame sealing ring extending in a funnel-shaped manner into the filling hole opening and has a sealing surface with a spherical cross-section, elastic sealing rings arranged between the filling hole frame-sealing ring and the filling hole frame, and a lifting device actuating the filling hole frame-sealing ring so as to vertically lift and lower the latter.

8 Claims, 1 Drawing Sheet

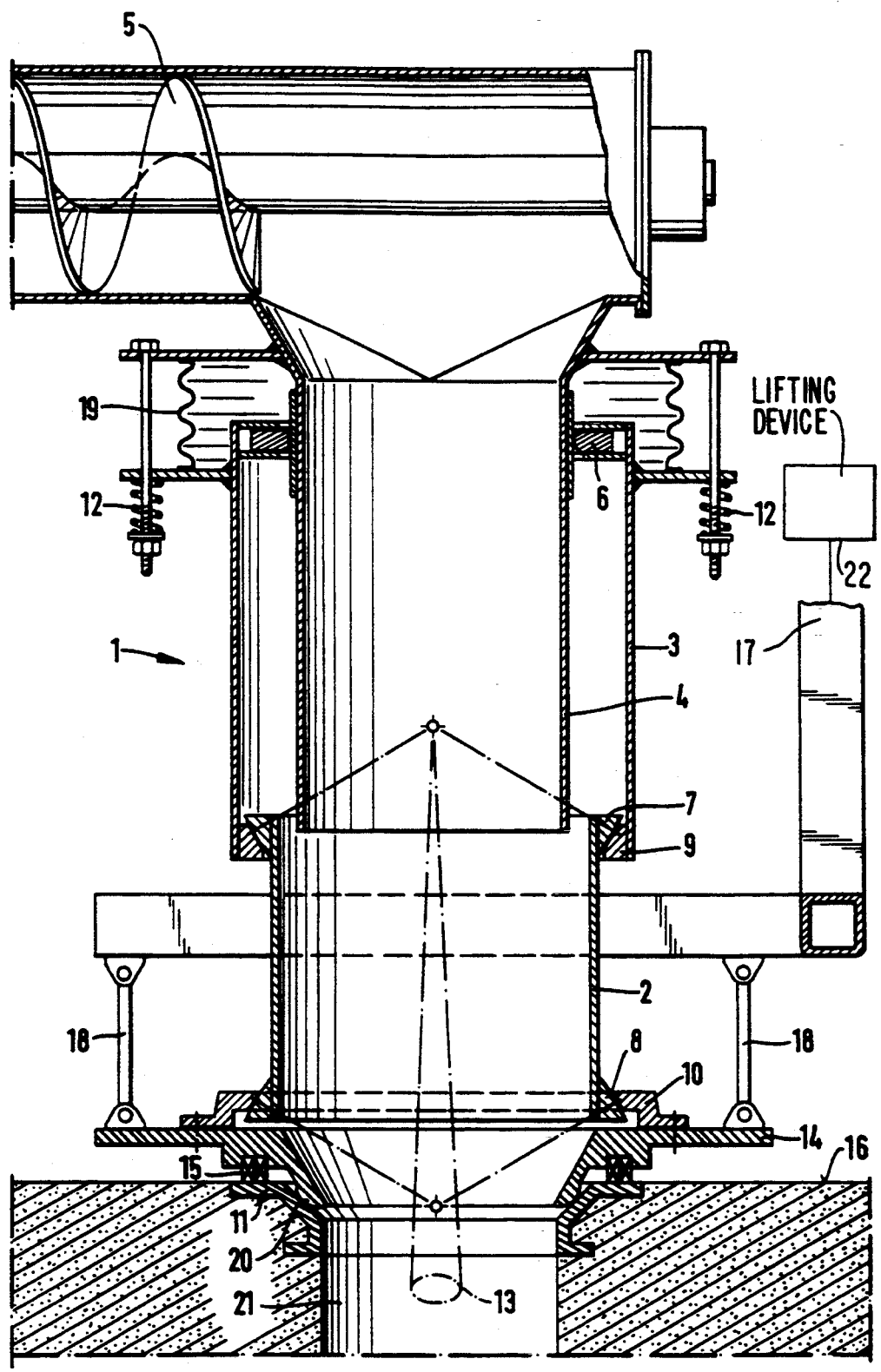

ARRANGEMENT FOR FILLING COAL IN OVEN CHAMBERS OF A COKE OVEN BATTERY

BACKGROUND OF THE INVENTION

The present invention relates to an arrangement for filling coal in oven chambers of a coke oven battery. More particularly it relates to an arrangement which fills coal with the aid of a telescopable filling tube arranged on a filling car and having a lower end lowerable to a filling hole frame of a filling hole of the coke oven battery.

In the process of filling the oven chambers of coke batteries, it is required in view of the corresponding regulations for the labor and environmental protection, to catch the dust-loaded and tar-loaded gases and to supply them into the collector of the coke oven battery. During the filling process these gases are subjected to different conditions and can escape under the action of over-pressure or insufficient draw to the collector through the filling hole openings. In order to prevent this phenomenon, a reliable sealing is required between the lower end of the filling tube and the filling hole frame, to be placed on the filling tube correspondingly during the filling process. In the praxis, especially in older coke oven batteries with uneven coke oven covers this frequently leads to positioning inaccuracies of the filling car, so that the vertical central axis of the fixed outlet tube of the filling car does not coincide with the vertical central axis of the filling hole or the filling hole frame. As a result, a more or less substantial offset is produced between both central axes, and its value can be several centimeters. In order to provide a reliable sealing between the filling hole frame and the upper part of the filling tube it is required that the upper part of the filling tube assume an inclined position corresponding to the offset.

The European patent document 0 399 212 discloses a solution of this problem, in accordance with which a construction is proposed such that it allows an inclined position of the lower part of the filling tube in correspondence with the offset. The sealing between the filling tube and the filling hole frame is performed by a sealing ring which is fixedly mounted on the lower end of the filling tube. In an inclined position of the lower part of the filling tube, the sealing ring during lowering of the filling tube is inserted inclinedly into the filling hole frame. When, however, the inclined position of the lower part of the filling tube exceeds a certain degree, this can easily lead to an imprecise seat of the sealing ring in the filling hole frame. The lack of tightness produced in this situation is responsible for undesirable emissions.

SUMMARY OF THE INVENTION

Accordingly, it is an object of the present invention to provide an arrangement for filling coal in oven chambers of a coke oven battery, which avoids the disadvantages of the prior art.

In particular, it is an object of the present invention to provide such an arrangement which ensures emission free filling of coal into oven chambers of coke oven batteries, wherein the lowermost part of the filling tube can assume an inclined position required by the offset and simultaneously the sealing ring can provide a reliable sealing on the filling hole frame, so that escape of emissions is prevented.

In keeping with these objects and with others which will become apparent hereinafter, one feature of the present invention resides, briefly stated, in an arrangement for filling coal in oven chambers of coke oven batteries which has the following features:

the lowermost tubular piece of the filling tube is provided on an outer side of its upper and lower ends with sealing rings having the shape of a portion of a sphere and wherein a circular-segment shaped outer surface of the lower sealing ring is directed upwardly and of the upper sealing ring is directed downwardly;

the tubular piece of the filling tube located above is also provided on the inner side of the lower end with a sealing ring having an upwardly inclined outer surface;

a contact ring is loosely arranged on the lower sealing ring and has an inner diameter and a shape corresponding to the outer diameter and the shape of the lower sealing ring;

the filling hole frame-sealing ring whose inner diameter corresponds to the diameter of the lower tubular piece and whose shape is formed so that it extends in a funnel-shaped manner into the filling hole opening and has a sealing surface formed as a spherical segment, is fixedly connected with the contact ring;

additional elastic sealing rings are arranged between the filling hole frame-sealing ring and the filling hole frame;

the filling hole frame-sealing ring is connected with an electrically or hydraulically operated lifting device to be vertically raised and lowered.

In accordance with another feature of the present invention, the filling hole frame-sealing ring is connected with the lifting device through a hinge rod and a lifting beam.

Still another feature of the present invention is that in the lower condition of the filling tube, a downwardly directed force acts on one tubular piece and an upwardly directed force acts on another tubular piece.

Finally, the elastic sealing rings can be composed for example of asbestos-replacing materials or other temperature resistant materials with ceramic or glass fiber inserts.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view schematically showing an arrangement for filling coal in oven chambers of a coke oven battery.

DESCRIPTION OF PREFERRED EMBODIMENTS

An arrangement in accordance with the present invention which is illustrated as an example has a filling tube 1 composed of a lower tubular piece 2 and an upper tubular piece 3 arranged on the lower tubular piece. It is to be understood that it is also possible that the filling tube 1 is composed of more than two tubular pieces.

The tubular piece 3 surrounds an outlet pipe 4 of a not-shown filling car.

For transportation of coal a screw conveyor 5 can be used for example in the outlet pipe 4. In some cases it is also possible to transport coal with a rotary plate or exclusively under the action of gravity from the filling car into the outlet pipe 4.

An elastic sealing element 6 is arranged on the upper end of the tubular piece 3. An especially suitable shape of the sealing element is disclosed for example in the German document DE-PS 39 13 320. In accordance with the invention, the lower tubular piece 2 is provided on its outer side of its upper and lower end with sealing rings 7 and 8 correspondingly. The sealing rings 7 and 8 have a shape of a portion of a sphere. In the shown embodiment this shape corresponds to the shape of a quarter sphere. It is to be understood that it can have also the shape which is different from a portion of a sphere. In the lower sealing ring 8 the circular-segment shaped surface faces upwardly and in the lower sealing ring 7 it faces downwardly. A sealing ring 9 is arranged on the inner side of the upwardly located tubular piece 3 on its lower end and has an upper surface inclined upwardly. The sealing rings are composed of steel.

A contact ring 10 is loosely arranged on the sealing ring 8 and has an inner diameter corresponding to the outer diameter of the sealing ring 8. The shape and the mass of the contact ring 10 is selected so that it can slide on the circular segment-shaped upper surface of the sealing ring 8. Due to the cooperation of the sealing rings 7 and 9 as well as the sliding of the contact ring 10 on the upper surface of the sealing ring 8, the tubular piece 2 can assume an inclined position without the contact ring 10 changing its horizontal position. The possible inclined positions of the tubular piece 2 is marked in the drawing by a cone 13.

The contact ring 10 is fixedly connected with the downwardly located filling hole frame-sealing ring 14. The latter in the lower position of the tubular piece 2 loosely lies on the filling hole frame 11 provided in an oven cover 16. As shown in the drawing, the filling hole frame-sealing ring 14 has an inner diameter corresponding to the diameter of the tubular piece 2. Therefore the filling hole frame-sealing ring 14 during an upward movement can apply an upwardly directed force to the tubular piece 2 and the sealing ring 8 connected with it. For this purpose the filling hole frame-sealing ring 14 is connected in the present embodiment with an electrically or hydraulically operated lifting device 22 through hinge rods 18 and a lifting beam 17. Thereby the filling hole frame-sealing ring 14 can be moved vertically upwardly and downwardly. In the event of the downward movement, the tubular piece 2 presses downwardly by the force acting on the sealing ring 8 through the contact ring 10 fixedly connected with the filling hole frame-sealing ring 14. The filling hole frame-sealing ring 14 maintains therefore always its horizontal position in any inclined position of the tubular piece 2.

Due to the inventive embodiment of the filling hole frame-sealing ring 14 which extends in a funnel-shaped fashion into the filling hole opening 21 and a sealing surface 20 which is formed as a portion of a sphere, both a reliable insertion of the sealing ring into the filling hole frame 11 and also a reliable sealing between the tubular piece 2 and the filling hole frame 11 are guaranteed. For improving the sealing action, additional elastic sealing rings 15 can be provided. They can be composed either of asbestos-replacing materials or other temperature resistant materials with a ceramic or glass fiber insert. The filling hole frame-sealing ring 14 is composed of steel or another cast material.

In the drawing the filling tube 1 is shown in a lowered position. In order to ensure the required sealing between the tubular pieces 2 and 3 and also between the tubular piece 2 and the filling hole frame 11, a downwardly directed force must act on the tubular piece 2 and an upwardly directed force must act on the tubular piece 3. The downwardly directed force action on the tubular piece 2 is provided by the lifting device, and this force is transmitted through the hinge rods 18. The upwardly directed force action on the tubular piece 3 is obtained by the helical springs 12. A flexible seal 19 is provided above the helical springs 12 and forms an additional sealing between the tubular piece 3 and the outlet pipe 4. The fixed connection between the contact ring 10 and the filling hole frame-sealing ring 14 can be provided in a suitable manner, for example by screwing.

With the utilization of the inventive arrangement, the above-outlined problems are solved in a satisfactory manner, and the movement of the tubular piece 2 corresponds to the movement of a hinge shaft.

It will be understood that each of the elements described above, or two or more together, may also find a useful application in other types of constructions differing from the types described above.

While the invention has been illustrated and described as embodied in an arrangement for filling coal in oven chambers of coke oven batteries, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for filling coal in oven chambers of a coke oven battery comprising a telescopable filling tube mountable on a filling car and having a lower end which is lowerable to a filling hole frame of a filling hole of a coke oven battery, said filling tube including a lower tubular piece and an upper tubular piece each having an upper end and a lower end; an upper sealing ring arranged on an outer side of said upper end of said lower tubular piece and a lower sealing ring arranged on an outer side of said lower end of said lower tubular piece, each of said sealing rings having the shape of a portion of a sphere and being provided with a circular segment-shaped outer surface arranged so that said circular segment-shaped outer surface of said lower sealing ring is directed upwardly and said circular segment-shaped outer surface of said upper sealing ring is directed downwardly; an additional sealing ring arranged on an inner side of said lower end of said upper tubular piece and having an outer surface which is inclined upwardly; a contact ring loosely located on said lower sealing ring and having an inner diameter and a shape corresponding to an outer diameter and a shape of said lower sealing ring; a filling hole frame sealing ring having an inner diameter corresponding to an inner diameter of said lower tubular piece and a shape formed so that it extends in a funnel-shaped manner into the filling hole opening and has a sealing surface with a spherical cross-section, said filling hole frame-sealing ring being fixedly connected with said contact ring; elastic sealing rings arranged between said filling hole frame-sealing ring and the filling hole frame; and a lifting device actuating said filling hole frame-sealing ring so as to vertically lift and lower the latter.

2. An arrangement as defined in claim 1, wherein said lifting device is an electrically operated lifting device.

3. An arrangement as defined in claim 1, wherein said lifting device is a hydraulically operated lifting device.

4. An arrangement as defined in claim 1; further comprising means for connecting said filling hole frame-sealing ring with said lifting device.

5. An arrangement as defined in claim 4, wherein said connecting means includes hinge rods and a lifting beam.

6. An arrangement as defined in claim 1, wherein said elastic sealing rings are composed of a temperature resistant material provided with an insert of another material.

7. An arrangement as defined in claim 6, wherein said insert is composed of a material selected from a ceramic material and a glass fiber material.

8. An arrangement for filling coal in oven chambers of a coke oven battery comprising a telescopable filling tube mountable on a filling car and having a lower end which is lowerable to a filling hole frame of a filling hole of a coke oven battery, said filling tube including a lower tubular piece and an upper tubular piece each having an upper end and a lower end; an upper sealing ring arranged on an outer side of said upper end of said lower tubular piece and a lower sealing ring arranged on an outer side of said lower end of said lower tubular piece, each of said sealing rings having the shape of a portion of a sphere and being provided with a circular segment-shaped outer surface arranged so that said circular segment-shaped outer surface of said lower sealing ring is directed upwardly and said circular segment-shaped outer surface of said upper sealing ring is directed downwardly; an additional sealing ring arranged on an inner side of said lower end of said upper tubular piece and having an outer surface which is inclined upwardly; a contact ring loosely located on said lower sealing ring and having an inner diameter and a shape corresponding to an outer diameter and a shape of said lower sealing ring; a filling hole frame sealing ring having an inner diameter corresponding to an inner diameter of said lower tubular piece and a shape formed so that it extends in a funnel-shaped manner into the filling hole opening and has a sealing surface with a spherical cross-section, said filling hole frame sealing ring being vertically liftable and lowerable, said filling hole frame-sealing ring being fixedly connected with said contact ring; and elastic sealing rings arranged between said filling hole frame-sealing ring and the filing hole frame.

* * * * *